Jan. 23, 1945.     E. R. LANING     2,367,786

ARTICLE FORMED OF IMPACT RESISTANT RUBBER

Filed Sept. 16, 1940

INVENTOR
EDWIN R. LANING.
BY Albert Sperry.
ATTORNEY

Patented Jan. 23, 1945

2,367,786

UNITED STATES PATENT OFFICE 2,367,786

ARTICLE FORMED OF IMPACT RESISTANT RUBBER

Edwin R. Laning, Philadelphia, Pa., assignor to Joseph Stokes Rubber Co., Inc., a corporation of New Jersey Application September 16, 1940, Serial No. 356,969

4 Claims. (Cl. 206—2)

My invention relates to hard rubber products and particularly to products which have a remarkably high resistance to fracture due to impact.

It has been proposed heretofore to provide constructions which have a metallic support or frame with a lining or cover formed of layers of relatively hard and soft rubber but such products rely primarily on the support or frame for their strength and resistance to impact. It has also been suggested that hard rubber products be provided with an outer covering of soft rubber to act as a bumper for preventing fracture of the hard rubber but for reasons explained hereafter such products are not suitably resistant to impact in many instances.

I have discovered that articles formed entirely of hard rubber and having a very high resistance to impact can be produced by forming the articles so that the properties of the rubber vary in a predetermined manner within the article.

To this end the outside or the face of the article which is expected to receive the greatest impact is formed of rubber which is harder or more resistant to deformation than the rubber of which the opposite side of the article or the interior thereof is formed. This arrangement is effective to increase the impact resistance of any combination of rubber compositions selected but the greatest impact resistance is obtained when the thickness or proportions of the differently constituted portions of the article bear a definite relation to the properties of the rubber in each portion or layer. By controlling the arrangement and proportions of the different rubbers used in a predetermined manner dependent upon the properties of the rubber, it is possible to obtain the maximum impact resistance consistent with other desirable or necessary properties of the article. Usually the impact resistance obtained exceeds that of the rubber in any individual part of the article.

The properties of rubber which appear to have the greatest influence on the resistance to impact are the hardness and the resistance to deformation which is hereafter referred to as "D" and is numerically equal to the tensile strength of the rubber at any point up to yield, divided by the percent of elongation.

Products embodying my invention are formed of rubber having a tensile strength of from about 1000 to 9000 pounds per square inch and an elongation of from about 1 to 80%. When the rubber has a tensile strength of say 5000 pounds per square inch and an elongation of say 5% it is said to have a "D" factor of 1000. In the practice of my invention the "D" factor of the rubber used may vary from about 250 to 5000 and the stock which receives the impact generally has a "D" value at least 200 higher than the softer stock in the article.

The hardness of the rubber used is determined by a "Shore durometer-D" and is taken after the needle of the instrument has been allowed to penetrate the rubber for 10 seconds; in practically all cases the hardness of the rubber as indicated by the instrument when so read is at least 50. The hardness of the softer layer or portion of the rubber as measured on this instrument may be as high as 75 or 80 whereas the hardness of the harder layer or portion does not seem to have any upper limit.

Rubber having the characteristics indicated above is referred to in the industry as "hard rubber" and therefore it should be understood that in describing my invention the terms "hard" and "soft" are used in a comparative sense to mean hard rubber having a greater or lesser degree of hardness or resistance to deformation and therefore a higher or lower "D" factor, within the ranges indicated above.

In producing articles in accordance with my invention layers of rubber having different characteristics may be laminated together or in the alternative a continuous body of rubber may be treated on opposite sides or in different parts thereof to impart the desired properties thereto.

In accordance with my invention these discoveries are utilized to produce hard rubber articles, such as storage battery boxes, for example, which are characterized by their high resistance to fracture on impact, their superior durability and long life.

One of the objects of my invention is to provide a novel type of hard rubber article possessing remarkably high resistance to impact.

Another object of my invention is to produce articles formed of hard rubber differing in resistance to deformation in different parts thereof with the material having the greater resistance to deformation in that part of the article which is subjected to the severest impact in use.

A further object of my invention is to provide hard rubber articles formed of rubber differing in hardness in different parts thereof with the harder rubber on the surface of the article which is subjected to the severest impact in use.

Another object of my invention is to provide articles formed of hard rubber which differs in hardness or in its resistance to deformation in different portions or layers thereof and in which the portions or layers are so proportioned and arranged as to impart the maximum resistance to impact to the article.

These and other objects and features of my invention will appear from the following description thereof in which reference is made to the figures of the accompanying drawing.

Figure 1:
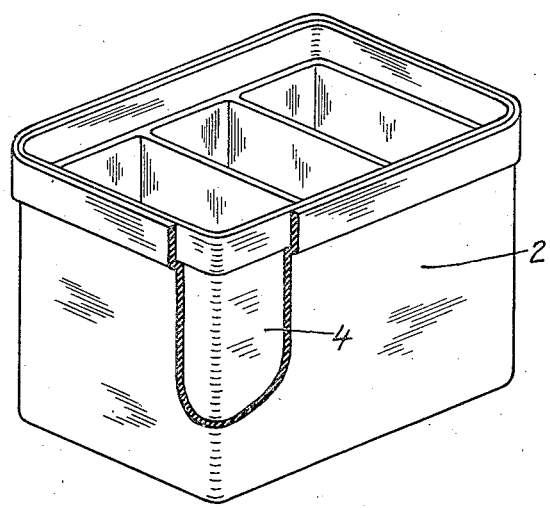
Fig. 1 is a perspective of a portion of a storage battery box embodying my invention with parts thereof broken away to illustrate the construction more clearly.

While my invention is adapted for use in producing a complete line of hard rubber products the nature of these products and the manner of producing the same will be evident from tests upon sample materials embodying my invention.

In one of these tests strips formed of two layers of hard rubber of equal thickness but differing in their resistance to deformation, as indicated by their D factor and differing in hardness as measured on the "Shore durometer-D," were laminated together and placed on supports spaced a known distance apart. A known weight was then dropped onto the strips midway between the supports and from different heights until a fracture had been produced. Identical strips when tested with first the softer and then the harder layer on the impact side gave the following results.

| Sample | Inches fall to fracture softer stock on top | Inches fall to fracture harder stock on top |
| --- | --- | --- |
| No. 1 | 1 | 4.2 |
| No. 2 | 1 | 4.6 |
| No. 3 | 1 | 3.7 |

These and other tests lead to the conclusion that greater impact resistance is obtained when the harder stock or that having the greater D factor receives the impact.

Further tests on similar samples were made in order to determine the relative thickness of the layers of the different stocks which gave the best results. For this purpose a number of series of laminated strips were produced in which the thickness of the different stocks varied while the total thickness of each sample remained the same. The stocks selected in a typical test were a hard stock having a tensile strength of 6000 lbs. per square inch and an elongation of 3% (D factor 2000) and a soft stock having a tensile strength of 9000 lbs. per square inch and an elongation of 6% (D factor 1500).

The hard stock is referred to in the following table as "P" while the softer stock is referred to as "B." The following results were obtained:

| Sample | Thickness top layer | Thickness bottom layer | Inches fall to fracture |
| --- | --- | --- | --- |
| No. 1 | None | All B-¼" | 6 |
| No. 2 | P-1/64" | B-15/64" | 6.4 |
| No. 3 | P-4/64" | B-12/64" | 6.8 |
| No. 4 | P-9/64" | B-9/64" | 6.05 |
| No. 5 | P-12/64" | B-4/64" | 3.45 |
| No. 6 | P-15/64" | B-1/64" | 1.7 |
| No. 7 | All P-¼" | None | 1.2 |

From these tests it is evident that when using the stocks selected, the impact resistance of the laminated products is greater than that of either of the materials of which the laminae are formed provided the harder layer is on the impact side and is not substantially thicker than the softer layer. The characteristics of the product can be plotted on a curve to indicate the resistance to impact with any given relative thicknesses of the stocks employed and such a curve will show an increase in impact resistance as the thickness of the harder layer is increased until a maximum is reached and then will show a decrease.

Further tests on these and other laminated stocks indicate that the relative thickness of the hard and soft layers which will give the maximum resistance to impact in any particular case are dependent upon the relative hardness and the difference in resistance to deformation of the stocks combined in the article.

Thus many samples tested have been found to possess the maximum impact resistance when the harder stock is thicker than the softer stock as illustrated by the following examples:

| Sample | Type of stock | Tensile strength | Percent elongation | "D" | Percent thickness at maximum impact resistance |
| --- | --- | --- | --- | --- | --- |
| No. 1 | Hard | 6,000 | 2 | 3,000 | 63 |
|  | Soft | 6,000 | 5 | 1,200 | 37 |
| No. 2 | Hard | 6,000 | 2 | 3,000 | 67 |
|  | Soft | 9,000 | 5 | 1,800 | 33 |
| No. 3 | Hard | 6,000 | 3 | 2,000 | 80 |
|  | Soft | 9,000 | 5 | 1,800 | 20 |

A study of the results obtained in a great number of tests indicates that no hard and fast rule may be made to define the thickness of the layers in terms of the hardness alone. However it is generally found that when the hardness of the stock on the impact side of a sample is but little greater than the hardness of the stock on the opposite side, say no more than about 3 points as measured on a "Shore durometer D," the impact strength is greatest when the harder stock is thicker than the softer stock. Conversely when the harder stock is considerably harder than the softer stock, say about 7 points or more on the "Shore durometer D," a greater impact resistance is obtained by the use of a layer of hard stock which is thinner than the layer of the softer stock with which it is combined. When the difference in hardness is from 3 to 7 points on the "Shore durometer D" the thickness of the layers which will give the maximum impact resistance may vary one way or the other depending upon other property of the stocks employed. This general rule applies almost universally when the product is formed of a single body of rubber treated to impart different characteristics to the opposite sides thereof and seems to apply in the majority of cases wherein layers of hard rubber are laminated together. Generally, also it is found that the greater the difference in hardness of the stocks employed, the thinner the layer of the harder stock required to give the maximum impact resistance. It is also found that the harder the stock facing the impact the thinner it need be even when the softer stock possesses a relatively high degree of hardness.

Referring to the resistance to deformation as represented by the value of "D" it may be similarly stated that no hard and fast rule as to the thickness of the layers used may be based on the "D" value alone. However in general it is found that when the value of "D" for the harder stock is less than about 1½ times the value of "D" for the softer stock the harder layer should be thicker than the softer layer in order to impart the maximum impact resistance to any combination of stocks. Conversely when the value of "D" for the harder stock is more than about 5 times the value of "D" for the soft stock the hard stock should be thinner than the softer stock to obtain the maximum resistance to impact in any combination. When the value of "D" for the harder stock is less than 5 and more than 1½ times the value of "D" for the softer stock, the thickness of the stocks may vary either way depending on other properties of the stocks employed. However, in all cases the "D" value for the harder stock should be at least 200 and preferably 400 higher than that of the softer stock.

In the tests described above the samples were formed of two layers of stock laminated together. It has been found from further investigation that substantially the same results are obtained when three or more layers of rubber are laminated together with the stocks arranged so that they decrease progressively in hardness and in their "D" value from the exterior or impact side toward the interior or opposite side of the article. Furthermore, articles formed of an integral body of rubber treated on opposite sides to impart different hardness or resistance to deformation thereto follow the same general rules as to resistance to impact and the relation of this property to the thickness or depth of the harder and softer portions of the rubber. Such integral products may be considered theoretically to embody an infinite number of layers of rubber differing in character and therefore reference to articles formed of "layers of rubber" as used in the claims should be understood to include articles treated to render them equivalent to infinitely laminated products.

In practically all uses of my invention the composition and properties of the stocks employed are selected because of some characteristic other than the impact resistance, such as the thermal resistance to deformation at elevated temperatures, dielectric strength, thermal expansion, acid resistance, cheapness, molding properties, or for other reasons. It is from the stocks possessing these selected properties that I choose those which may be combined or treated to impart to the finished article the additional characteristic of a high impact resistance.

While my invention may be utilized in the production of any hard rubber article it is particularly adapted for use in the manufactured hollow articles such as hard rubber storage battery boxes. Therefore, in order to illustrate embodiments of my invention reference is made hereafter to storage battery boxes with the understanding that they are chosen as typical hard rubber articles and without intending to limit my invention thereto.

In that form of my invention illustrated in Fig. 1, a storage battery box is formed of laminated material in which the stock of the outer layer 2 is harder than that of the inner layer 4. These stocks are made up separately and are inserted into the mold in the form of sheets, with the harder stock adjacent the outer walls thereof or in position to face the probable source of impact. The thicker softer stock is placed in the mold adjacent the hard stock and in position to be engaged by the core of the mold. The thickness of the layers 2 and 4 are determined by the properties of the stock and are proportioned to provide the maximum impact strength obtainable with the compositions employed. The material is then subjected to heat and pressure to vulcanize the rubber whereby the layers of material are permanently bonded together and a storage battery box produced wherein the hard stock is located on the exterior of the box in those locations in which impact is expected and the softer stock is located on the interior of the battery box. In this way a product is obtained which is formed entirely of hard rubber and is characterized by its high resistance to impact.

Figure 2:
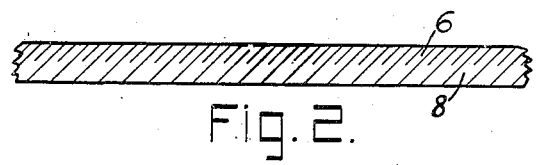
Fig. 2 is a vertical sectional view through a portion of an article embodying an alternative form of my invention.
Figure 3:
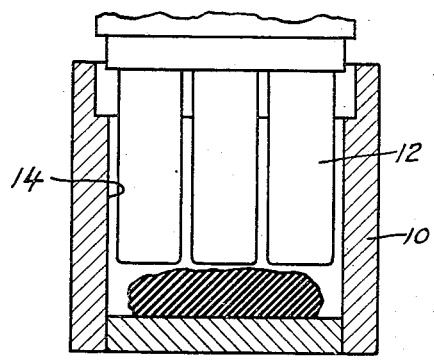
Fig. 3 is a diagrammatic illustration of a typical mold and core adapted for use in the practice of my invention.

In that form of my invention illustrated in Figs. 2 and 3 the product is not laminated but is so formed or treated as to impart greater hardness or resistance to deformation to rubber which forms the exterior of the article than to rubber which forms the interior thereof. The hardness may vary gradually from the outer surface 6 of the article as seen in Fig. 2 to the inner surface 8 thereof or the hard layer adjacent the outer surface of the box may be relatively thin and in the nature of a surface hardening depending upon the method and treatment used in molding and vulcanizing the article.

In producing storage batteries in which the body is made up of a single continuous mass of rubber differing in hardness on the opposite sides thereof the rubber stock may be placed in a mold such as that shown at 10 in Fig. 3 and subjected to heat and pressure. By maintaining the temperature of the outer mold 10 higher than the temperature of the core 12 which cooperates with the mold to form the inner surface of the storage battery box, it is possible to produce difference in the hardness of the material adjacent the inner and outer surfaces of the article. In a typical instance the temperature of the mold 10 may be 25° F. higher than the temperature of the core 12 although much greater or somewhat smaller differences in temperature may be employed to impart the desired characteristics to the finished product. This temperature difference may be attained by passing steam at different temperatures through the mold and the core or by any other suitable means.

With this method of forming storage battery boxes the degree of vulcanization of the rubber adjacent the outer mold is substantially higher than the degree of vulcanization of that portion of the rubber adjacent the core with the result that the hardness of the outer surface of the storage battery box exceeds that of the inner surface thereof. Moreover since there is a relatively constant temperature gradient between the outer mold and the inner core the degree of vulcanization and therefor the hardness of the rubber varies nearly constantly from the outer surface to the inner surface of the resulting storage battery box.

In an alternative method of producing storage battery boxes embodying my invention the inner surface 14 of the mold 10 is dusted with sulphur or some other suitable vulcanizing agent is applied thereto. During the molding operation the sulphur or vulcanizing agent carried by the mold comes into contact with the rubber stock adjacent thereto with the result that the outer face of the stock is vulcanized to a greater extent than the inner surface of the stock which is adjacent the core. The degree of penetration of the sulphur or vulcanizing agent into the stock in such cases is largely dependent upon the amount and character of the vulcanizing agent carried by the mold and upon the temperature and length of time of treatment. By suitable control of these factors the thickness and hardness of the harder portion of the stock can be varied to impart the desired impact resistance to the finished article.

Articles other than storage battery boxes embodying my invention may be molded or formed in various ways. Thus a laminated product may be produced by cementing layers of material together instead of vulcanizing them together. It is also desired in some articles embodying my invention to provide the maximum impact resistance consistent with other characteristics which are desired in an article and in such cases the relative thickness and hardness of the hard and soft layers or portions of the product may differ considerably from those which would impart the maximum possible impact resistance with the combination of materials employed.

For these reasons it should be understood that products embodying my invention may take various forms and need not be so formed or constructed as to possess the maximum possible impact resistance which may be attained when using the stocks embodied therein. It is also possible to produce articles embodying my invention by various methods other than those herein suggested. In view thereof it should be understood that the embodiments of my invention described above and shown in the figures of the drawing are intended to be illustrative of my invention and are not intended to limit the scope thereof.

What I claim is:

1. An article formed entirely of hard rubber having a tensile strength of from about 1000 to 9000 pounds per square inch and an elongation of from about 1 to 80%, said article being characterized by its high resistance to impact, and the rubber of said article possessing different degrees of hardness on opposite faces thereof, the rubber on that face of said article expected to receive the greater impact being at least 3 points harder than the rubber on the opposite face of said article as measured by a "Shore durometer D," and the rubber on said opposite face having a hardness of from about 50 to 80 points as measured by that instrument.

2. An article formed entirely of hard rubber having a tensile strength of from about 1000 to 9000 pounds per square inch and an elongation of from about 1 to 80%, said article being characterized by its high resistance to impact and being formed of two layers of rubber possessing different degrees of hardness as measured by a "Shore durometer D," the layer of rubber located on that face of said article expected to receive the greater impact being thinner and harder than the layer of rubber on the opposite face of said article, the thicker layer of rubber having a Durometer hardness of from about 50 to 80 points, and the thinner layer of rubber having a Durometer hardness at least 7 points greater than that of the thicker layer.

3. An article formed entirely of hard rubber having a tensile strength of from about 1000 to 9000 pounds per square inch, an elongation of from about 1 to 80%, and a hardness as determined by a "Shore durometer D" of at least 50 points, said article being characterized by its high resistance to impact and the rubber of which said article is formed possessing different degrees of resistance to deformation on opposite faces thereof, as indicated by the numerical value of the tensile strength of the rubber at any point up to yield, divided by the percentage of elongation, said value being in each case from about 250 to 5000 and the value for the rubber on that face expected to receive the greater impact being at least 200 higher than the value for the rubber on the opposite face of the article.

4. An article formed entirely of hard rubber having a tensile strength of from about 1000 to 9000 pounds per square inch, an elongation of from about 1 to 80%, and a hardness as determined by a "Shore durometer D" of at least 50 points, said article being characterized by its high resistance to impact and being formed of two layers of rubber differing in resistance to deformation as indicated by the numerical value of the tensile strength of the rubber at any point up to yield divided by the percentage of elongation, said value being in each case from about 250 to 5000, the layer of rubber on that face of the article expected to receive the greater impact being thinner than the layer of rubber on the opposite face thereof and having a value for its resistance to deformation of at least 5 times the value for the resistance to deformation of the thicker layer of rubber.

EDWIN R. LANING.